United States Patent [19]
Ginosar et al.

[11] Patent Number: 5,941,982
[45] Date of Patent: Aug. 24, 1999

[54] EFFICIENT SELF-TIMED MARKING OF LENGTHY VARIABLE LENGTH INSTRUCTIONS

[75] Inventors: Ran Ginosar, Nofit; Rakefet Kol, Haifa, both of Israel; Kenneth Scott Stevens, Hillsboro, Oreg.; Peter A. Beerel, Long Beach; Kenneth Yi Yun, San Diego, both of Calif.; Christopher John Myers, Salt Lake City, Utah; Shai Rotem, Beaverton, Oreg.

[73] Assignee: Intel Corporation, Santa Clara, Calif.

[21] Appl. No.: 08/997,461

[22] Filed: Dec. 23, 1997

[51] Int. Cl.$^6$ ....................................................... G06F 9/30
[52] U.S. Cl. ............................................................ 712/210
[58] Field of Search .............................................. 712/210

[56] References Cited

U.S. PATENT DOCUMENTS

| | | | |
|---|---|---|---|
| 5,488,710 | 1/1996 | Sato et al. ................................ | 712/210 |
| 5,539,347 | 7/1996 | Grochowski et al. ................... | 712/204 |
| 5,758,116 | 5/1998 | Lee et al. ................................. | 712/210 |
| 5,870,599 | 2/1999 | Hinton et al. ............................ | 712/239 |

*Primary Examiner*—William M. Treat
*Attorney, Agent, or Firm*—Kenyon & Kenyon

[57] ABSTRACT

A self-timed instruction marking circuit includes a long instruction processing system to divide long instruction processing between two columns of the instruction marking circuit. Length decoders are interconnected across columns to signal the presence and length of long instructions. Self-timed marking can continue without alteration. The number of connections required by the instruction marking circuit are reduced. The marking process can be optimized to efficiently process all instructions by setting the definition of a long instruction such that commonly executed instructions are not included.

18 Claims, 14 Drawing Sheets

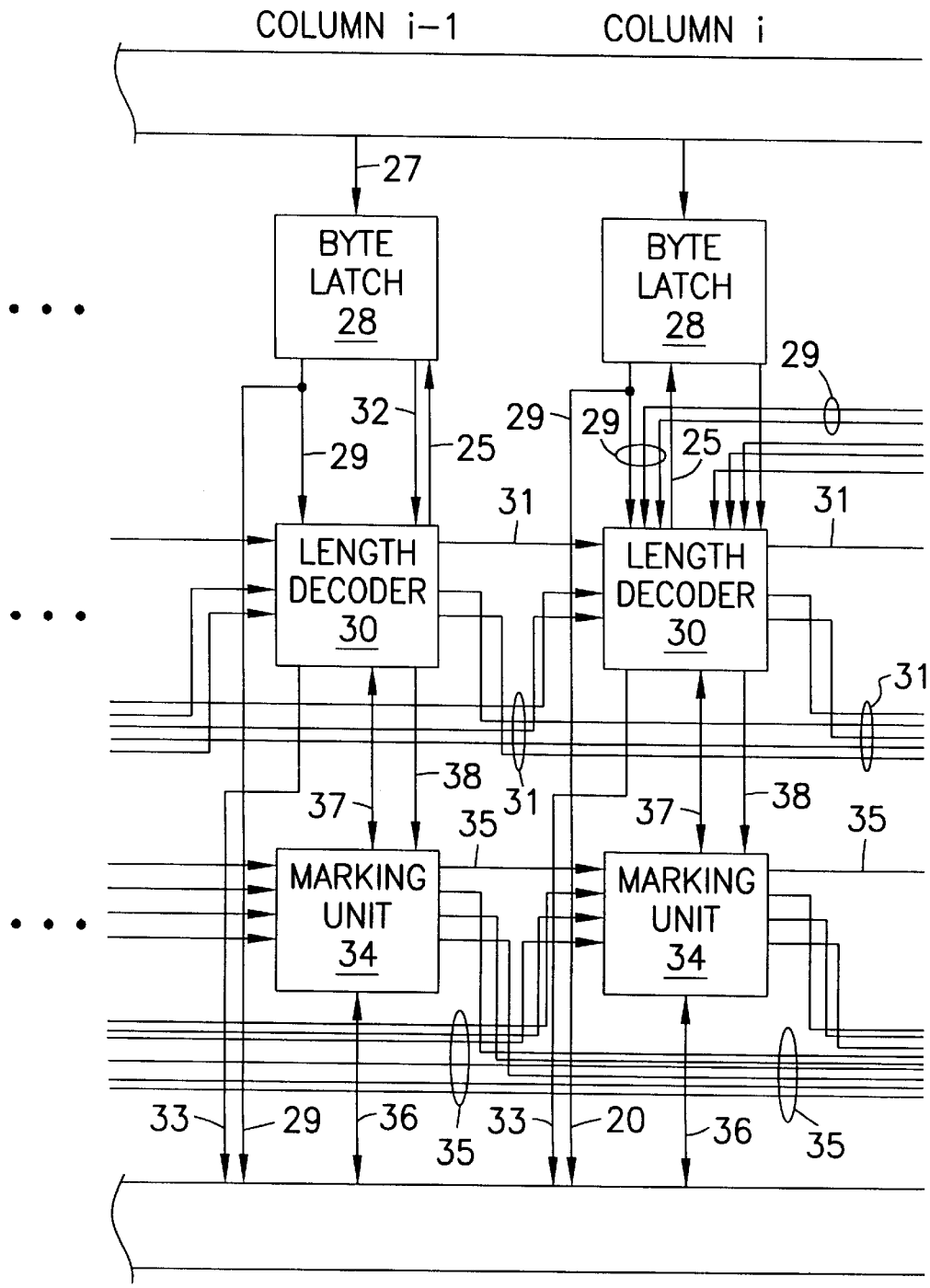
Fig. 2.1

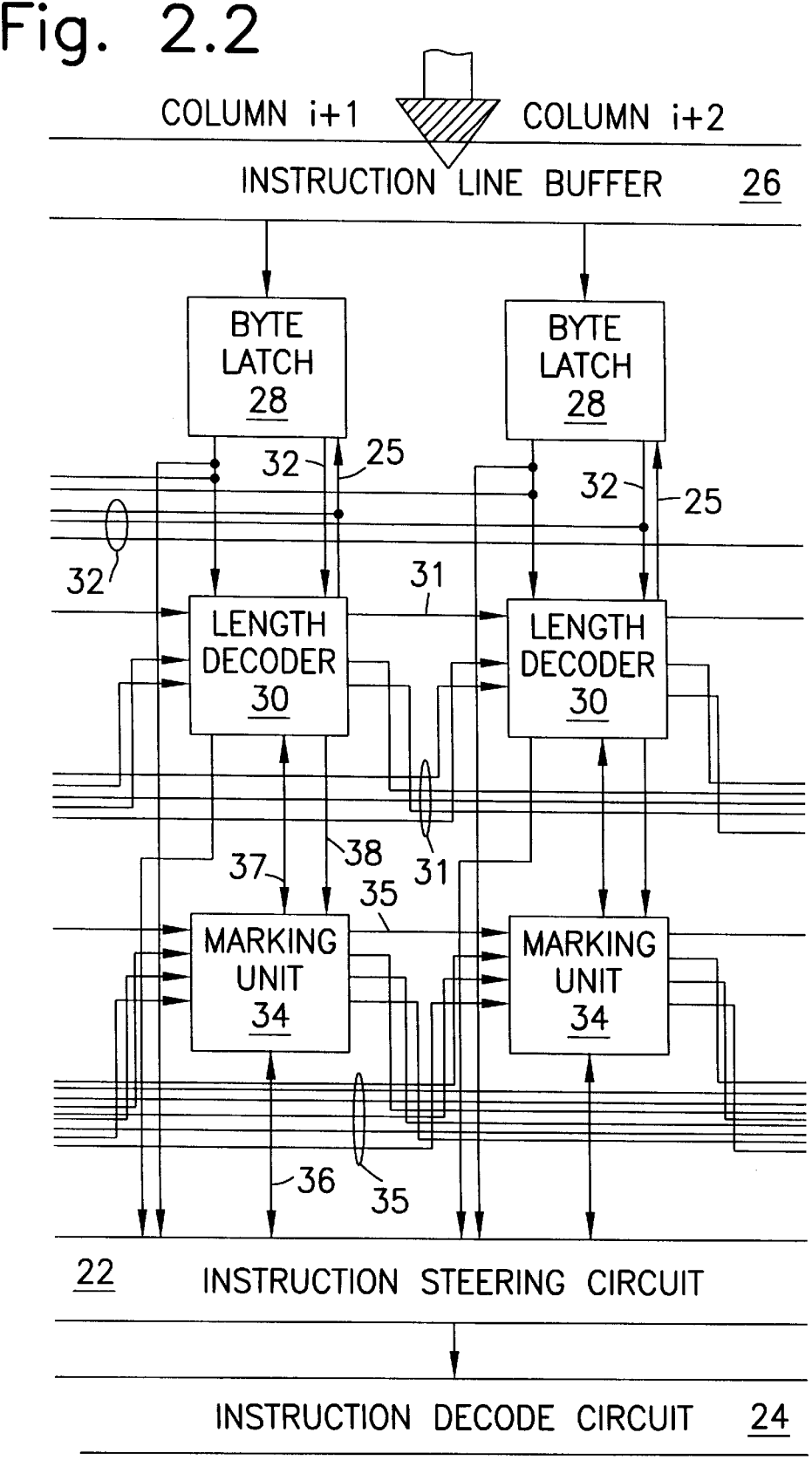
Fig. 2.2

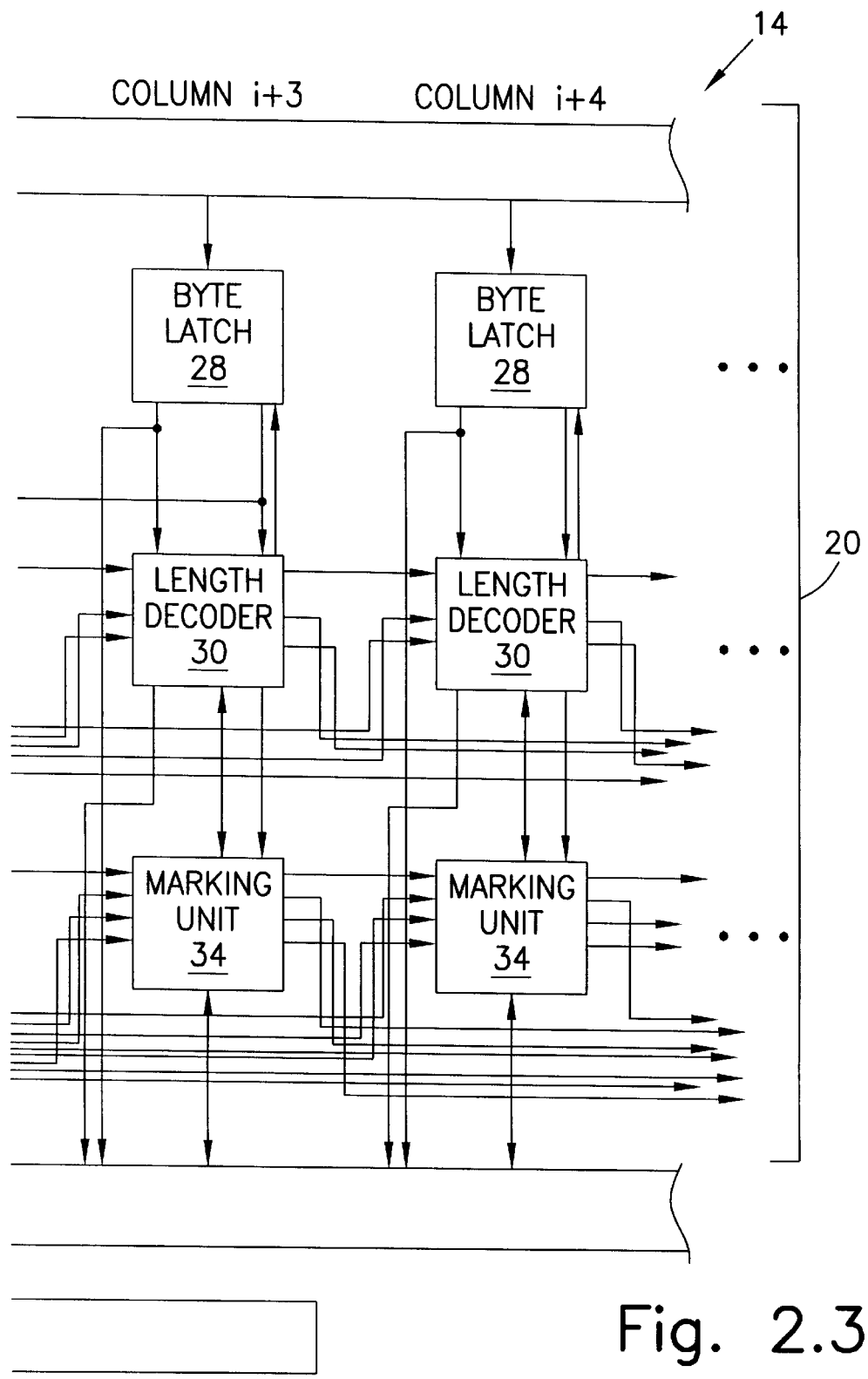
Fig. 2.3

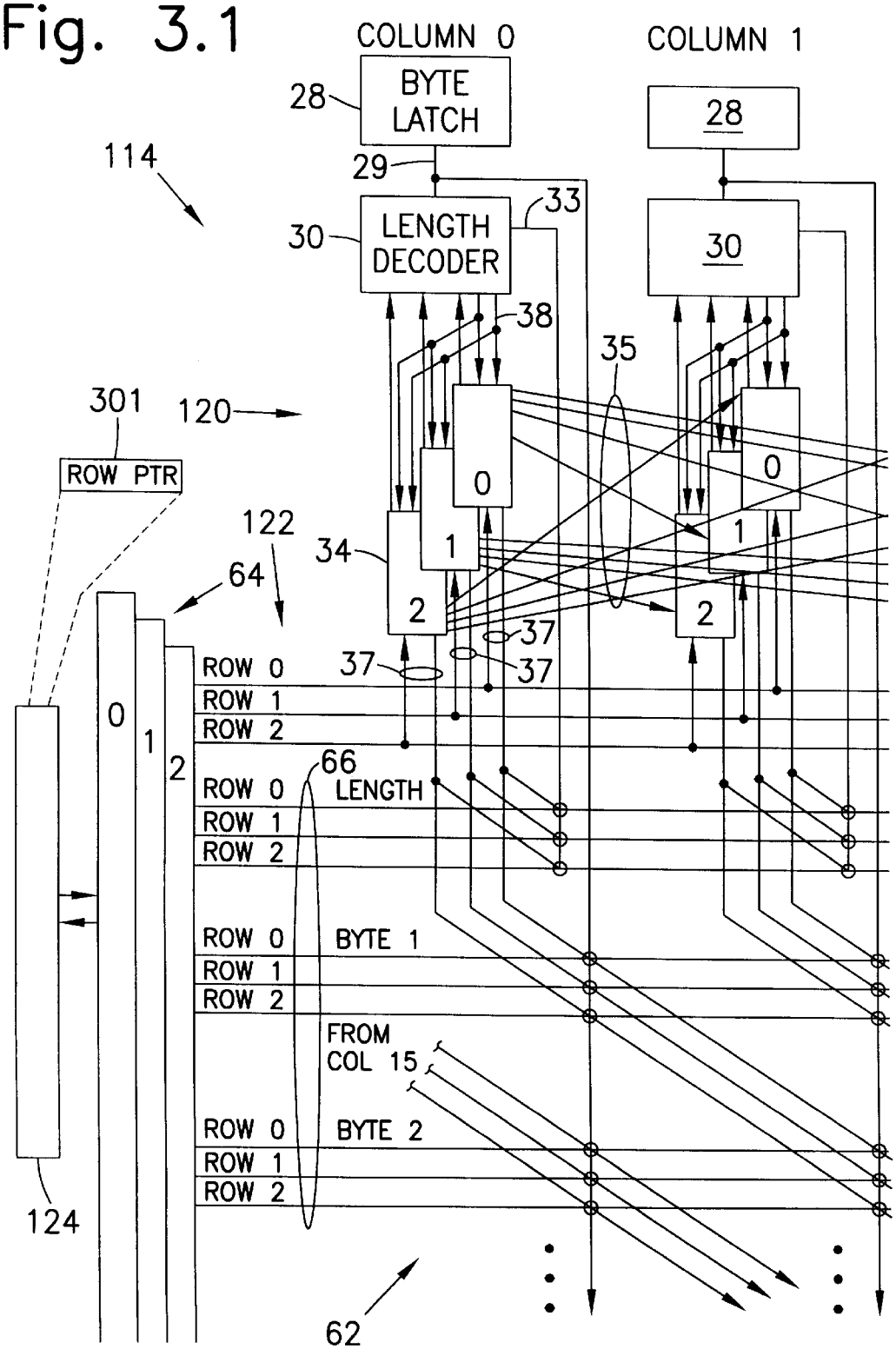
Fig. 3.1

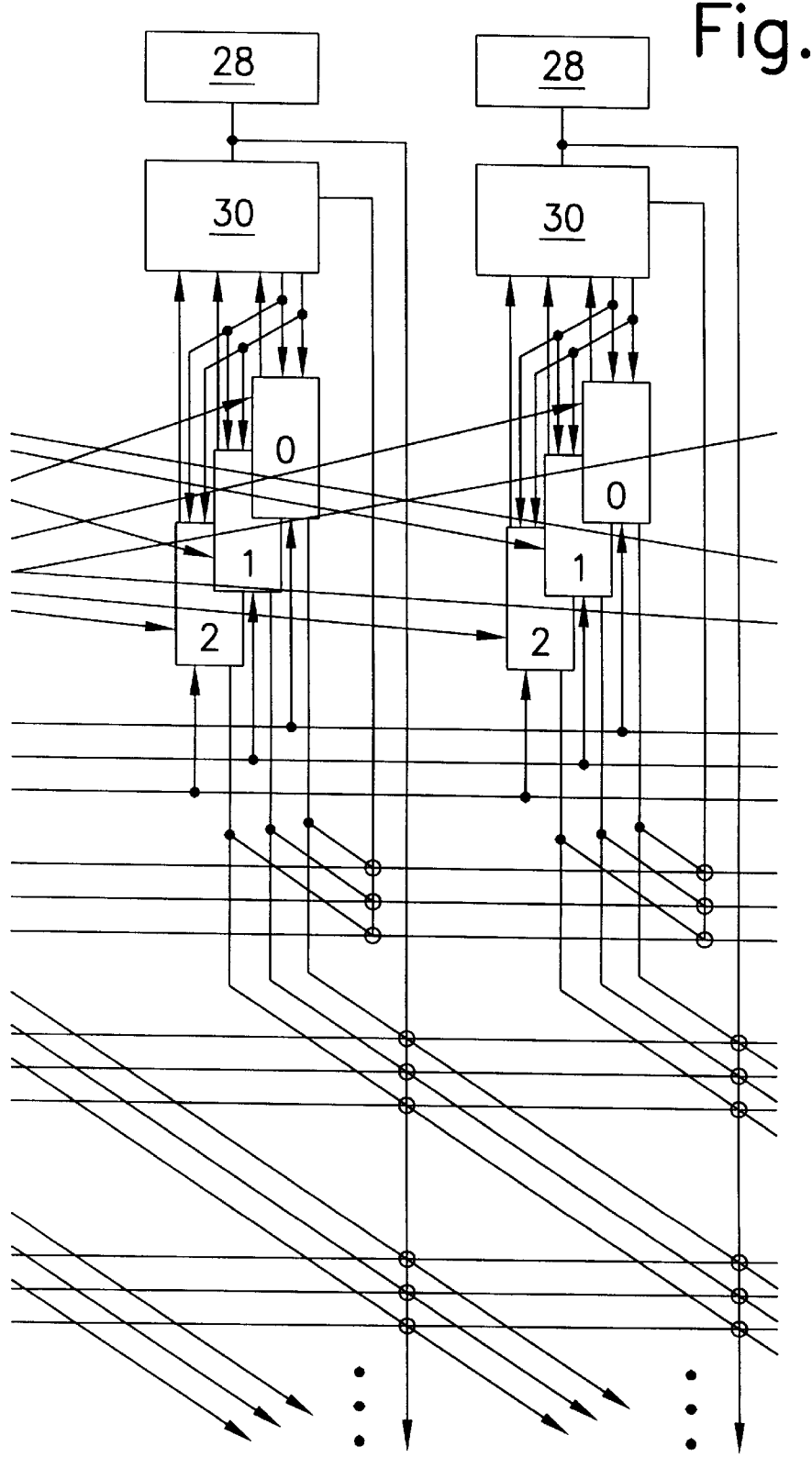
Fig. 3.2

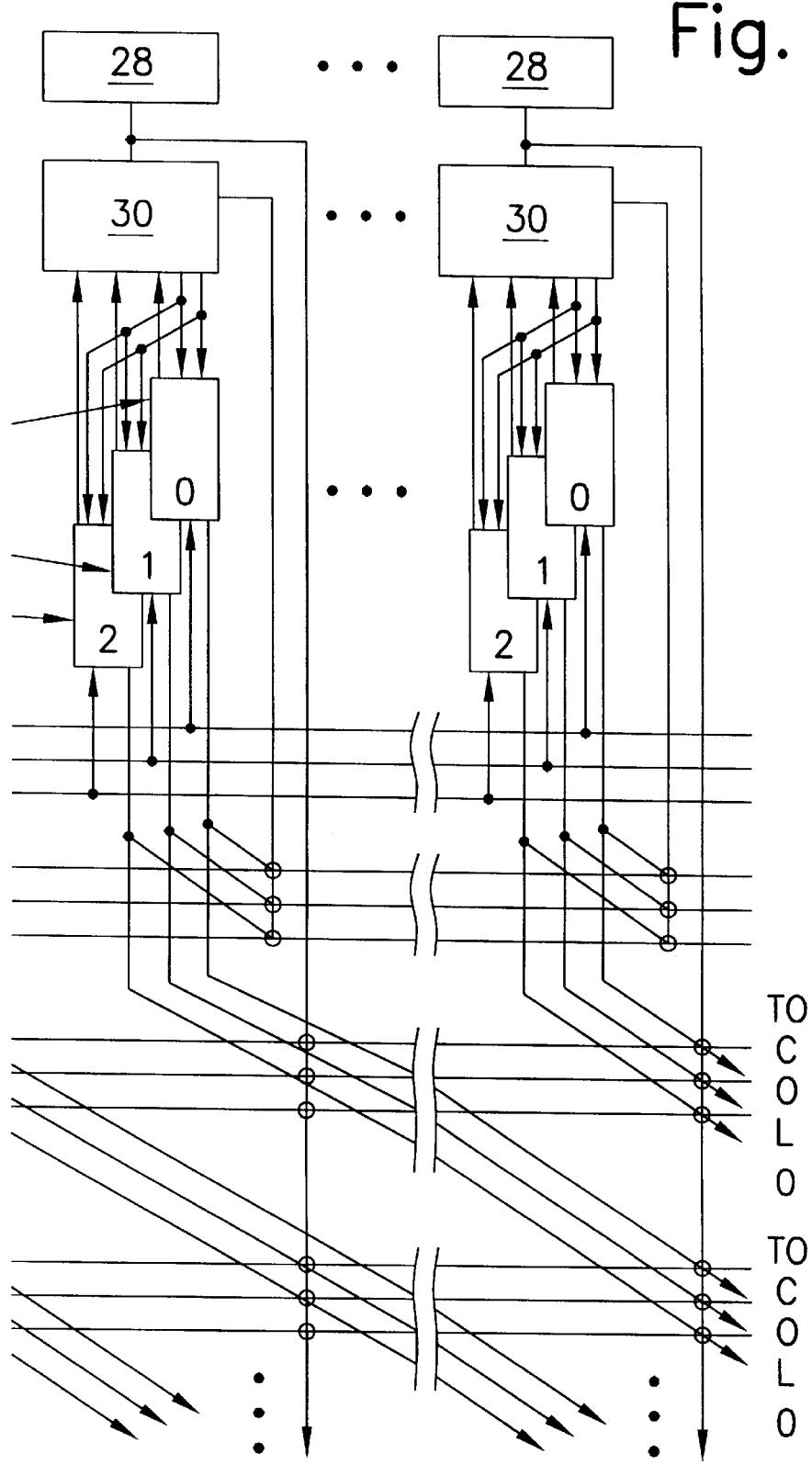
Fig. 3.3

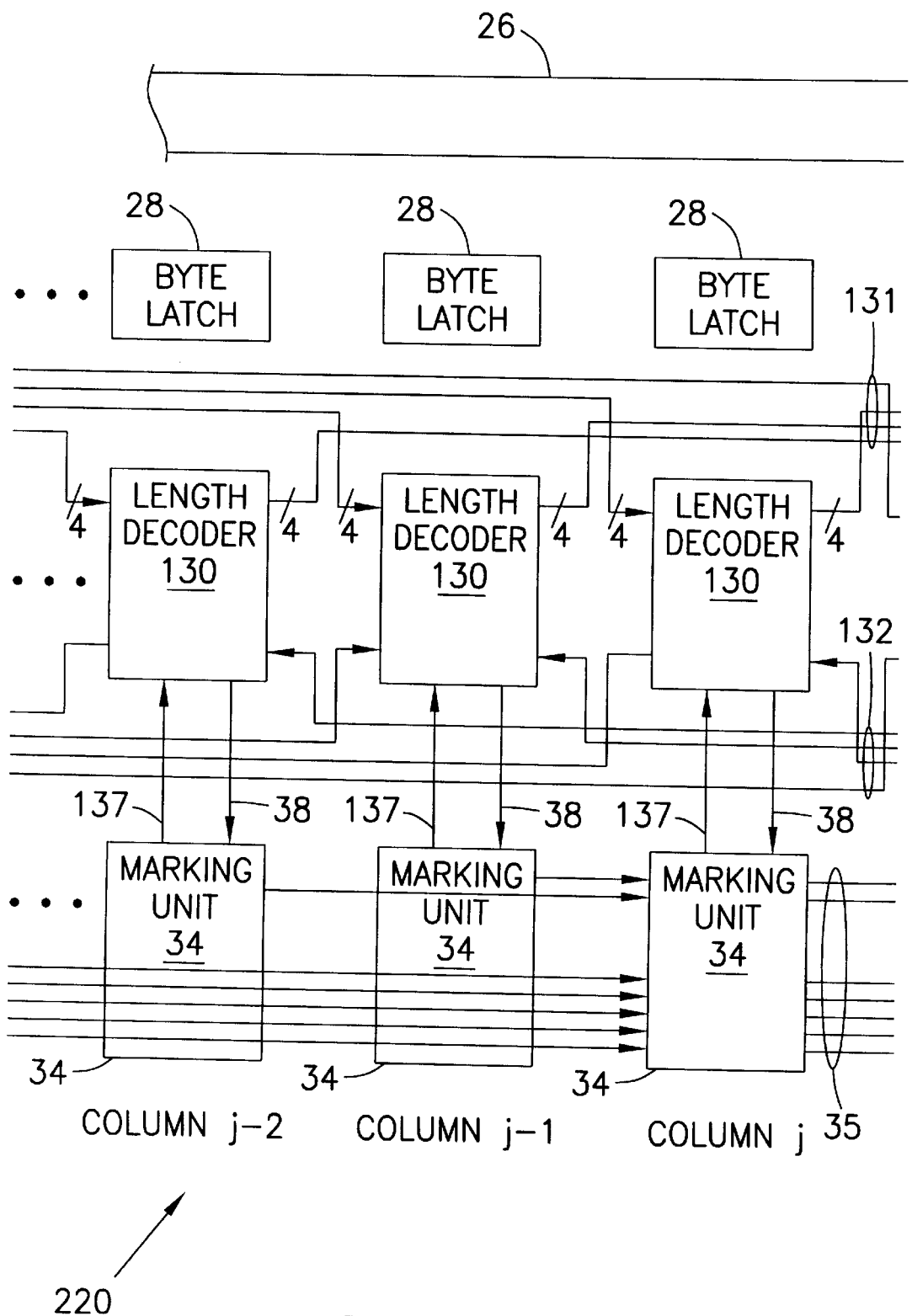
Fig. 4.1

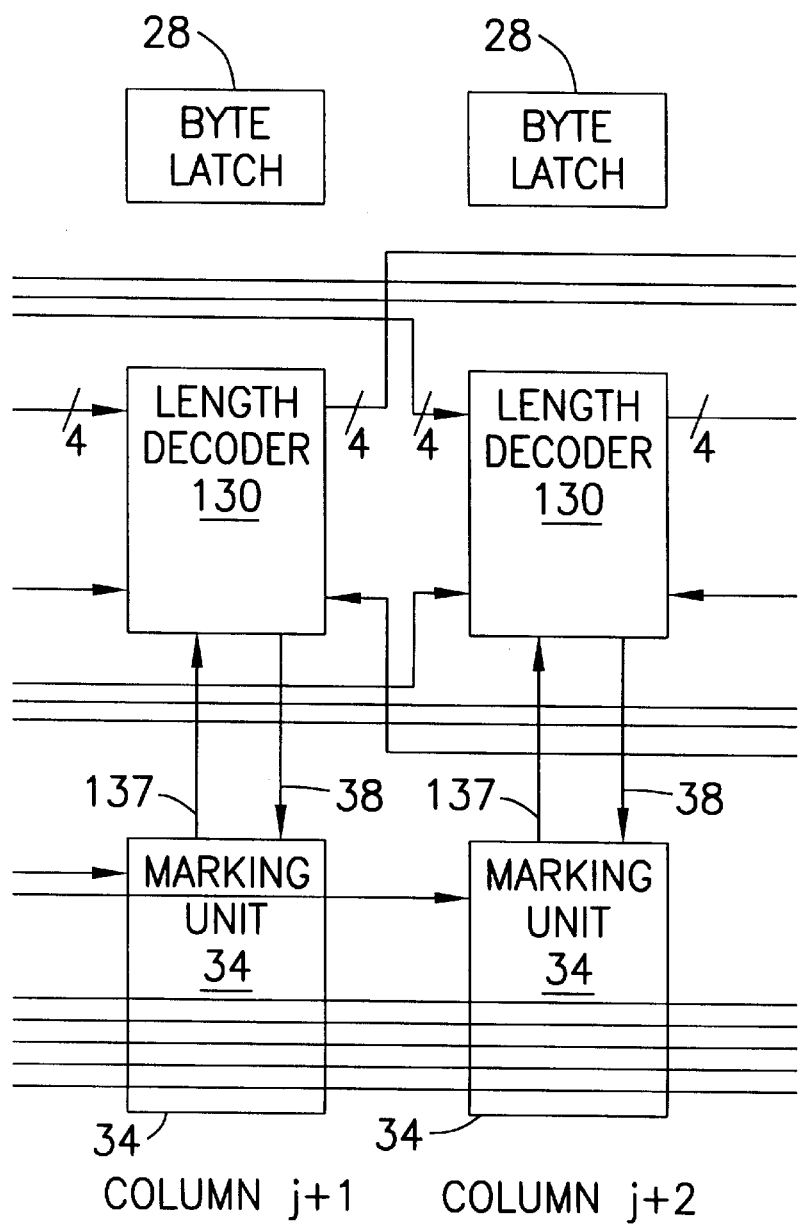
Fig. 4.2

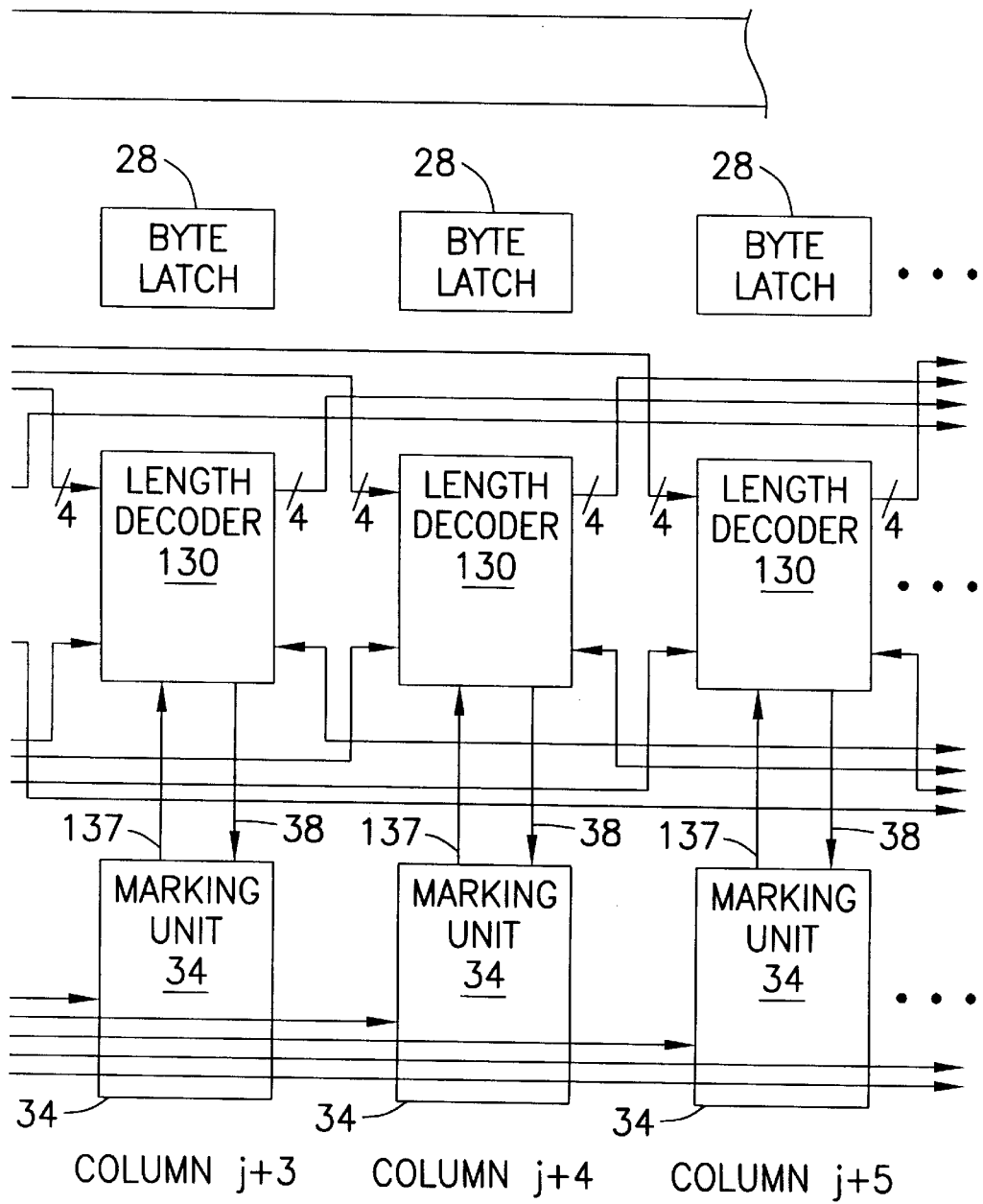
Fig. 4.3

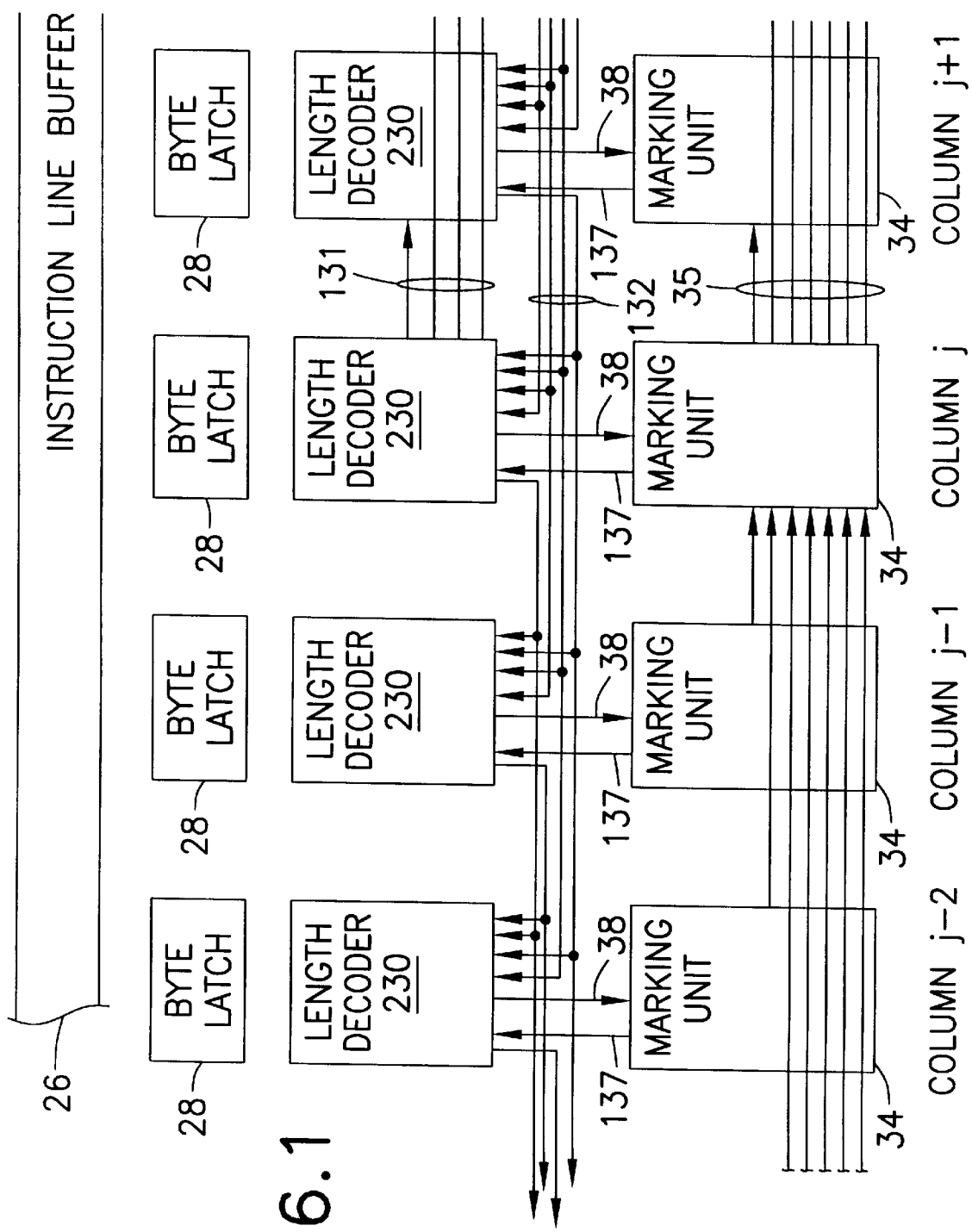
Fig. 6.1

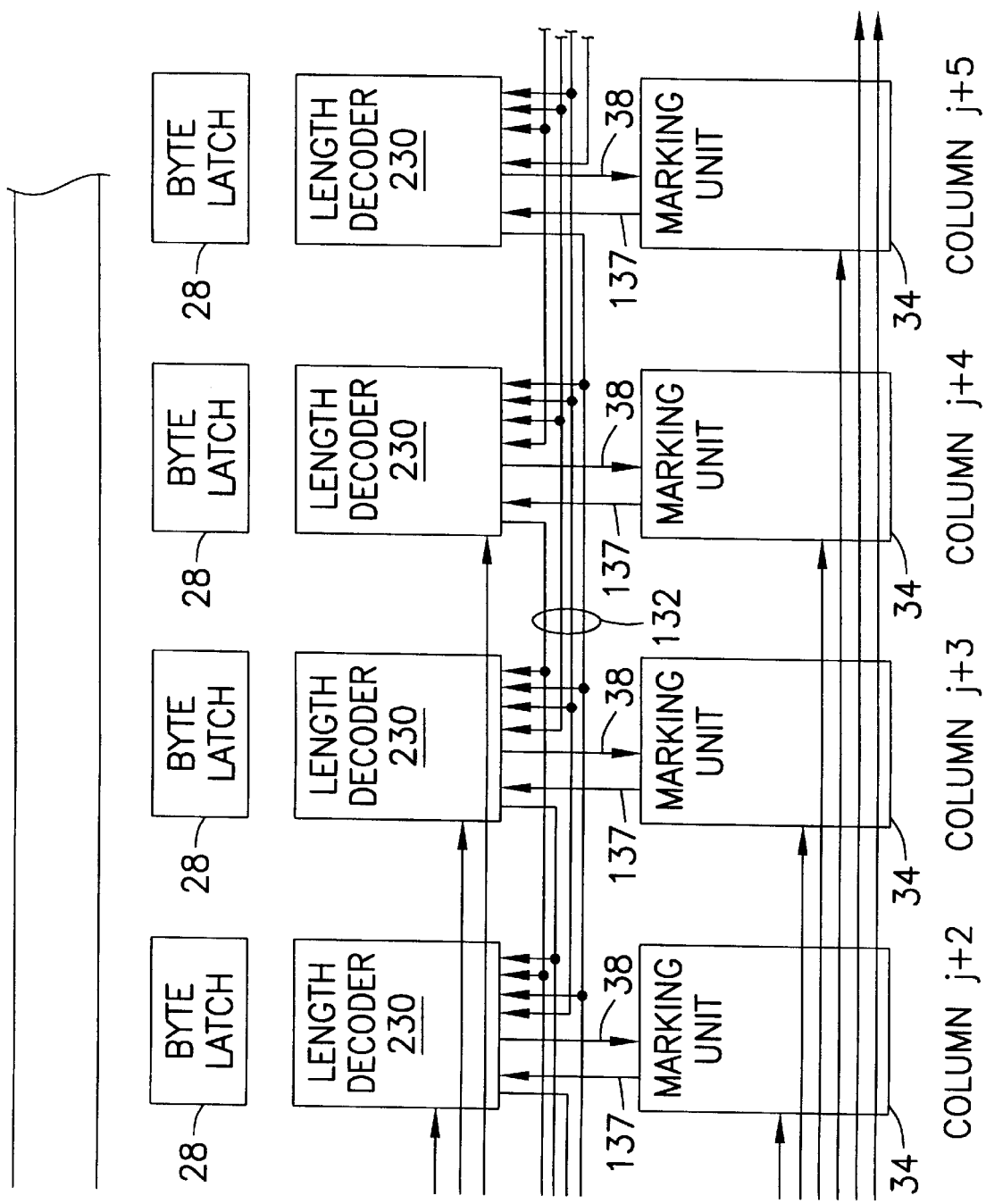
Fig. 6.2

EFFICIENT SELF-TIMED MARKING OF LENGTHY VARIABLE LENGTH INSTRUCTIONS

FIELD OF THE INVENTION

The present invention is directed to a computer system executing variable length instructions. More particularly, the present invention provides an instruction decoding circuit.

BACKGROUND OF THE INVENTION

Computer systems are capable of executing various arithmetic and logic operations on data. The particular arithmetic or logic operation to be executed is indicated by an "instruction" that is typically retrieved from a memory of the computer system, decoded in an instruction decode block, and then transmitted to an execution block of the computer for execution. Computer programs comprise a set of instructions that, when taken from memory, decoded and transmitted to the execution block in a certain sequence, cause the computer system to execute a series of operations that achieve the objective of the program.

There are computer systems designed to implement a variable length instruction architecture, wherein instructions can vary in length from, for example, one byte to eleven bytes or more. However, memory systems, and in particular the cache memory used to store instructions prior to execution, typically store data in fixed sized blocks such as, for example, sixteen byte blocks. In such a system, instruction data is fetched in sixteen byte lines aligned on sixteen byte boundaries. Accordingly, in a variable length instruction architecture, each fixed sized line fetched from memory contains instructions of various lengths that may start anywhere within the line and may even cross a line boundary into a succeeding line of memory.

An instruction marking circuit is typically implemented in the instruction decode block of a computer having a variable length instruction architecture in order to mark the beginning of each instruction in a line fetched from a fixed sized line memory system. The instruction marking circuit includes length decoders, which process a selected byte or number of bytes of the fetched line to determine a length for the instruction containing the bytes. Once instruction lengths are determined and first instruction bytes are marked, the instructions of the fetched line can be transmitted to an instruction decoding circuit within the decode block.

Instruction marking is, by nature, a serial operation, since the beginning of a particular instruction can be determined with certainty only after the beginning and length of a previous instruction have been determined. In present instruction marking circuits, the serial nature of instruction marking is accommodated by performing the marking operation according to an externally-timed scheme that controls and synchronizes circuit operations by a system clock. Marking information is propagated through the marking circuit in synchronization with the system clock. The length decoders that are typically used in marking circuits, however, comprise combinational logic circuits that perform length decodes in varying amounts of time depending upon the particular instruction being processed. To assure that all possible instructions found in an instruction line fetched from memory will be marked, the timing of the clock signals must be sufficient to process a "worst case" decode time for an instruction. That is, the timing must be sufficient to permit signals to traverse the longest path through the combinational logic of the length decoder, thus delaying the propagation of marking signals through the marking circuit when the instruction is not a "worst case" instruction.

Only a limited subset of instructions are of the "worst case" instruction type. Thus the time required for processing this relatively small subset of instructions is imposed on all marking operations such that the overall time needed for instruction marking is longer than actually required in most instances. As a result, the known scheme for marking instructions in a variable length instruction architecture incurs wasteful delay in the instruction execution process, decreasing system performance.

The patent application Ser. No. 08/997,457, entitled "Parallel Processing and Self-Timed Serial Marking of Variable Length Instructions" (filed on even date herewith), provides for fast and efficient instruction decoding through the self-timed length decoding, marking, and steering of instructions. An embodiment of a portion of a computer system according to the teachings of the aforementioned application is shown in FIG. 1 (and described in more detail by the aforementioned application). As shown in FIG. 1, an instruction fetch, decode, and execute pipeline 1 is implemented in a computer system. An instruction cache 10 is a memory used to store a set of instructions that are most likely required by the computer for execution in the near future, in accordance with known caching techniques. The instructions are stored in and fetched from the instruction cache 10 in instruction lines, each comprising a fixed sized block of bytes, for example, sixteen bytes. Each instruction line stored in the instruction cache 10 is aligned within the memory along a sixteen byte boundary. Each instruction contained in a line can vary in length from one byte to the maximum byte length used in the computer system, and any particular line of instructions can contain instructions of any combination of byte lengths.

An instruction fetch block 12 operates to fetch a line of instructions for input to an instruction decode block 14. The instruction decode block 14 decodes the instructions within the line fetched from the instruction cache 10 for input to an execution block 16 for execution, as is generally known. An instruction issue block 18 can be implemented to receive decoded instructions from the instruction decode block 14 for transfer to the execution block 16.

As noted above, the instructions stored in the instruction cache 10 can vary in length and instructions of any combination of lengths can be found in any particular instruction line fetched from the instruction cache 10. Accordingly, the instruction decode block 14 includes an instruction marking circuit 20 that operates to mark the first byte of each instruction contained in a fetched line. Once marked, the instructions are transferred, for example, to an instruction steering circuit 22 to await transfer to an instruction decode circuit 24. The instruction decode circuit 24 decodes the instructions and outputs decoded instructions to the instruction issue block 18.

FIG. 2 shows a first embodiment of an instruction decode block 14 using the self-timed techniques of the aforementioned application. Instruction lines fetched from the instruction cache 10 by instruction fetch block 12 are received by an instruction line buffer 26 of the instruction marking circuit 20. Instruction line buffer 26 may be implemented as a FIFO, such that multiple instruction lines can be stored in anticipation of the marking process.

The instruction marking circuit 20 can be described as being arranged in "columns" corresponding to each byte position of the instruction line buffer 26. Thus, for an instruction line width of, for example, sixteen bytes, the instruction marking circuit 20 can be described as having sixteen columns. Those columns corresponding to the first byte positions of the instruction line buffer (i.e. lower memory addresses) are considered the "front" of the instruction marking circuit, while those columns corresponding to the last byte positions of the instruction line buffer (i.e. higher memory addresses) are considered the "end" of the instruction marking circuit. Relative to each other, columns associated with lower memory addresses are considered upstream columns, while columns associated with higher memory addresses are considered "downstream" columns.

Each byte of the instruction line is separately sent to a respective byte latch 28 in each column of the instruction marking circuit 20. The byte is processed by a length decoder 30 for that same column of the instruction marking circuit 20, together with any additional downstream bytes in byte latches 28 of downstream columns, as may be required by the length decoding algorithm used in the variable instruction length architecture. The combinational logic implemented in the length decoder 30 produces a signal indicating the computed length of the instruction, under the assumption that the byte being processed is the first byte of an instruction.

To indicate instruction length, each length decoder 30 has a number of length signal outputs. The length signal outputs are coupled to length signal output lines 38, which are further coupled to other functional units in the instruction marking circuit 20, as described below. The number of length signal outputs (and, therefore, length signal outputs lines 38) is dependent on the maximum possible instruction length and the encoding scheme used for length signals. For the example of FIG. 2, the maximum possible number of bytes in an instruction is four, and the length signals are implemented as "one-hot" signals, i.e., only one signal is provided as active for each byte length. As a result, each length decoder 30 shown in FIG. 2 has four length signal outputs, one for a one byte instruction, one for a two byte instruction, and so on. Each length decoder 30 asserts a "one-hot" signal on the length signal output line 38 corresponding to the length determined by the length decoder 30 for the current byte being processed in that column.

Since each length decoder 30 asserts the appropriate length signal as soon as it completes the length decode for the current byte, length information may be available much earlier than under the "worst-case" decode time.

A plurality of marking units 34 is also provided, one in each column of the instruction marking circuit 20. The instruction length output lines 38 coupled to each length decoder 30 are also coupled to the marking unit 34 for the same column. Each marking unit 34 is further coupled to a number of marking lines 35 used to carry marking signals to mark a subsequent byte as the first byte of the next instruction. The number of marking lines 35 corresponds to the maximum number of bytes possible in the variable length instruction architecture. Thus, as shown in FIG. 2 for a maximum instruction length of four bytes, each marking unit 34 is coupled to four marking lines 35, one corresponding to each byte length available in the variable length instruction architecture. Accordingly, each marking unit 34 is also coupled to four marking lines 35 carrying marking signals generated by four upstream marking units 34.

Based on the length signals provided by the length decoder 30, the marking unit 34 determines the column containing the first byte of the next instruction in the instruction line. The marking unit 34 indicates the first byte of the next instruction by directly signaling a subsequent marking unit 34 in a downstream column via a marking signal over the appropriate marking line 35. Marking may be achieved, for example, by sending a "one-hot" signal over the appropriate marking line 35 to a downstream marking unit 34. Each marking line 35 is coupled between the marking unit 34 of the present column and a marking unit 34 for a subsequent column: the marking line 35 used to signal a one byte length instruction is coupled to the marking unit 34 for the next column of the instruction marking circuit 20; the marking line 35 used to signal a two byte length instruction is coupled to the marking unit 34 two columns away, and so on. The marking unit 34 asserting a marking output thereby directly marks the first byte of the next instruction of the fetched line.

For those marking units 34 at the end of the instruction marking circuit 20, the marking lines 35 used to mark a column beyond the end of the instruction marking circuit 20 are "wrapped around" to the marking units 34 at the front of the instruction marking circuit 20. The marking information transmitted via the wrapped-around marking lines 35 therefore marks the first byte of the first instruction on the next fetched instruction line.

Activation of a marking output of a marking unit 34 is controlled by satisfaction of certain system conditions. For example, a marking unit 34 waits for an indication that its column contains the first byte of an instruction, as provided by the marking signal received over the marking lines 35 from upstream marking units 34. A marking unit 34 also waits for an indication that the bytes that comprise the instruction have been loaded into their respective byte latches 28 and are ready for transmission, for example, as provided by an INSTRUCTION_READY signal provided by length decoder 30 and carried by length decoder handshaking lines 37. A marking unit 34 also waits for an indication that the instruction steering circuit 22 is available to receive an instruction for decoding and execution, for example, as provided by a BUFFER_AVAILABLE signal produced by instruction steering circuit 22 and carried by output buffer handshaking lines 36. These signals can arrive in any order.

Once these conditions have been satisfied, the instruction bytes are transmitted from the byte latches 28 to the instruction decode circuit 24 over byte latch output lines 29 and via a crossbar switch and output buffer within the instruction steering circuit 22. Instruction length data is also transmitted from the length decoder to the instruction decode circuit 24 via the crossbar switch and output buffer. The byte latches 28 are then loaded with new bytes from the next instruction line in instruction line buffer 26. A marking signal is concurrently sent over a marking line 35 to the marking unit 34 in the downstream column containing the first byte of the next instruction. The marking unit 34 in that downstream column may then perform a similar marking and transfer operation.

As a result of the above, the generation and transmission of all instruction bytes and marking information flows through the length decoders 30 and marking units 34 in a self-timed manner, and at an average speed that is faster than clocked circuits. To further increase the throughput of the instruction length decoding and marking process, processing of the bytes in a next instruction line can begin as soon as the individual byte latches 28 processing previous instruction bytes become available. The wrap around marking information generated during a current instruction line remains available to mark the first byte of the first instruction in the next instruction line.

In a second embodiment of an instruction decode block implementing self-timed instruction length decoding, marking, and steering, as described in the aforementioned patent application, multiple self-timed marking units 34 are employed to increase the throughput capabilities of the instruction decode block 114. FIG. 3 shows such an embodiment, wherein the instruction decode block 114 is implemented having sixteen columns and is capable of processing instructions up to 4 bytes in length. As shown in FIG. 3, instruction marking circuit 120 is implemented using multiple marking units 34 in each column, with each marking unit 34 of the column given a different "row" designation for descriptive purposes. Marking signals are propagated through the marking circuit by sending the marking signals to the marking unit 34 of the next higher row in the column to be marked. The number of rows to be implemented in an instruction marking circuit 20 can be determined based on a calculation of the speed of instruction marking in relation to the speed of the steering function. For the embodiment shown in FIG. 3, three rows (row 0, row 1, and row 2) are implemented in instruction marking circuit 120, although other quantities can be implemented.

The instruction steering circuit 122 is implemented to mirror the instruction marking circuit 120, such that instruction steering circuit 122 contains a crossbar switch 62 having a number of rows equal to the number of rows in the instruction marking circuit 120, and a number of output buffers 64 equal to the number of rows in the instruction marking circuit 120. Instruction bytes are transferred, via the row of the crossbar switch 62 that is the same row as the row of marking unit 34 that has processed those instruction bytes, the output buffer 64 of the same row designation as the row of the marking unit 34. Instructions are therefore incrementally spread across each output buffer 64, allowing the instruction decode circuit 124 to fetch instructions sequentially from each output buffer using, for example, a row pointer 301.

A more detailed description of the self-timed length decoding, marking, and steering of instructions may be found in the aforementioned patent application, which is expressly incorporated herein by reference.

The maximum possible instruction length of the architecture directly affects the number of lines required to implement the self-timed instruction decode circuit. For example, an architecture having a maximum instruction length of four requires four marking lines between the marking unit of a particular column i and the marking units of downstream columns i+1, i+2, i+3, and i+4, respectively. An architecture having a maximum instruction length of five, however, requires five marking lines between the marking unit of column i and the marking units of columns i+1, i+2, i+3, i+4, and i+5, respectively. In a system having an instruction line width of 16 bytes, for example, each additional maximum instruction byte length therefore adds 16 new marking lines to the circuit.

Furthermore, where the multiple marking unit configuration of the self-timed instruction decoding system is used (as described in the second embodiment above), each additional byte of instruction length increases the number of marking lines by a multiple of the number of rows in the circuit. For example, for an instruction decode circuit having three rows, each additional byte length increases the number of required marking lines threefold.

Thus, when the maximum instruction length of the architecture is large, the number of marking lines required to implement a marking circuit according to the self-timed implementations described above can become burdensome to implement. The high number of connections requires more chip area, and increases power consumption and signal latency. The chip design layout of the marking circuit also becomes more complex.

Also, it may be the case that a certain subset of instructions is commonly executed in the computer system. If these commonly executed instructions are generally of short length, it is desirable to "optimize" the complexity of the circuit for these short instructions without an appreciable reduction of overall throughput.

SUMMARY OF THE INVENTION

An instruction marking circuit may be implemented according to the present invention. An embodiment of the instruction marking circuit according to the present invention comprises a plurality of columns, each one of the columns including a length decoder and a self-timed marking unit. The length decoder has a length signal output, a long instruction output and a long instruction input. The long instruction output of the length decoder of each column is coupled to the long instruction input of a length decoder of a downstream column to provide a long instruction signal. The self-timed marking unit is coupled to the length decoder, and has at least two marking outputs and at least one marking input to provide marking signals. One of the marking outputs is coupled to a self-timed marking unit of the downstream column, and another marking output is coupled to a self-timed marking unit of a second downstream column. One marking input is coupled to a self-timed marking unit of an upstream column.

In further embodiments of the present invention, the instruction marking circuit includes a handshaking system between length decoders. This handshaking system can entail, for example, the length decoder having a long instruction acknowledge output and a long instruction acknowledge input, wherein the long instruction acknowledge input of one length decoder is coupled to the long instruction acknowledge output of another length decoder in a downstream column to provide a long instruction acknowledge signal.

BRIEF DESCRIPTION OF THE DRAWINGS

FIG. 2 is a block diagram of an embodiment of a self-timed instruction decode block.

FIG. 3 is a block diagram of an embodiment of a self-timed instruction decode block having multiple marking units.

FIG. 4 is a block diagram of a first embodiment of a self-timed instruction marking circuit according to the present invention.

FIG. 6 is a block diagram of a second embodiment of a self-timed instruction marking circuit according to the present invention.

DETAILED DESCRIPTION

Figure 1:
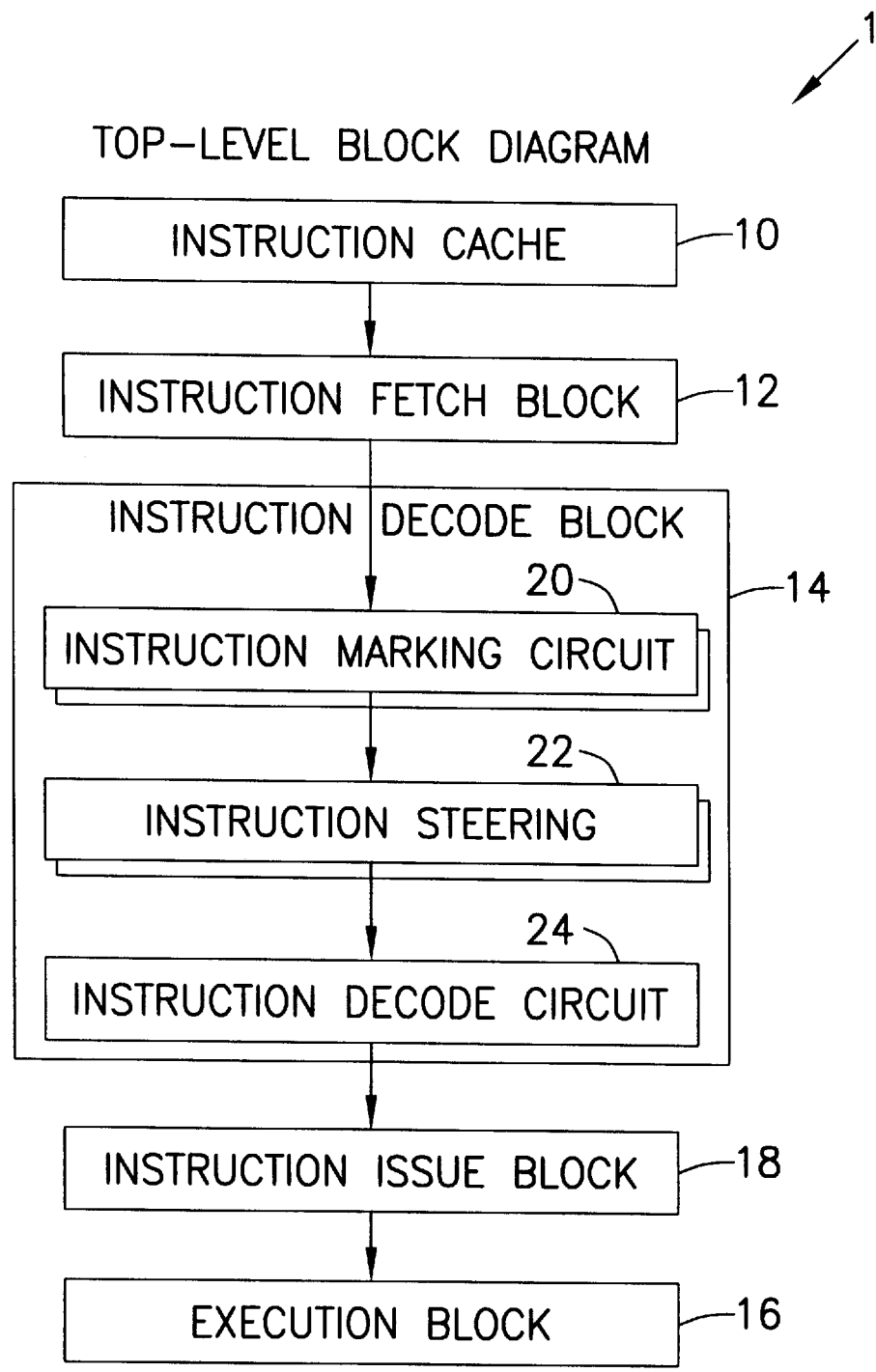
FIG. 1 is a block diagram of a representative instruction fetch, decode and execute pipeline of a computer system.

A self-timed instruction length decoding and marking system can be implemented according to the present invention using a scheme for efficiently processing long instructions. Long instructions are split into a group of "head" bytes and a group of "tail" bytes. The instruction marking circuit is implemented such that long instruction signal lines are connected between columns to allow each length decoder to signal a length decoder in a downstream column that a long instruction is being processed, and therefore that the downstream column contains the first tail byte. Since the self-timed marking system is asynchronous, the instruction marking circuit also includes acknowledge lines between each length decoder to provide acknowledgment signals upon receipt of the long instruction signal.

Operation of the instruction marking circuit is similar to that of the normal self-timed marking process. Long instruction processing is invoked if, during length decoding, the length decoder detects the presence of a long instruction. A long instruction signal is then sent to a downstream length decoder to indicate that it contains the first byte of the tail of the instruction. The downstream column acknowledges receipt of the long instruction signal and sets its length signal outputs according to the proper tail length (as provided by the content or context of the long instruction signal). Likewise, the signaling column sets its length signal outputs according to the proper head length (as provided by the decoding process). Once the proper head and tail lengths have been provided to the marking units of the respective columns, self-timed marking continues according to the normal self-timed marking process. Indication is given in the instruction length data of the head bytes as to the actual complete length of the instruction, so that downstream circuitry (for example, the instruction decode circuit) can reconstruct the actual instruction.

The long instruction handling system can also be implemented in instruction marking and steering circuits that use multiple marking units, crossbar switches, and output buffers. The operation in the multiple marking unit case would be the same as for the single marking unit case.

By "splitting" the processing of long instructions into a "head" section and a "tail" section, the number of lines required to implement the instruction marking circuit is reduced. If a long instruction is defined such that those instructions that are commonly executed are not processed as long instructions, the long instruction processing system can be optimized to efficiently handle all instructions with a minimal degradation of throughput from the additional processing.

The present invention will now be described with reference to FIGS. 4–7, which depict a first and a second embodiment of a self-timed instruction marking circuit according to the present invention. Each embodiment is illustrated for the case of an instruction architecture having a maximum instruction length of eleven bytes, and having an instruction line width of sixteen bytes. As will be known to those of skill in the art, the invention can be applied to instruction architectures of longer or shorter instruction lengths, or longer or shorter instruction line widths. Also, each embodiment is implemented for an "optimal" instruction length of seven bytes, i.e., most of the instructions commonly executed by the computer system are seven bytes long or less. Thus, a "long" instruction in the context of these embodiments is an instruction of eight, nine, ten or eleven bytes in length. The invention can, of course, be applied to "optimal" instruction lengths of different sizes.

FIG. 4 shows a block diagram of a portion of a self-timed instruction marking circuit 220 according to the first embodiment of the present invention. Although only a portion of the instruction marking circuit 220 is shown, the interconnection and operation of the described generic columns (column j, j+1, j+2, and so forth) is equivalent to that of all columns of the circuit. The self-timed instruction marking circuit 220 includes byte latches 28, length decoders 130, and marking units 34, with each byte latch 28, length decoder 130 and marking unit 34 located in a separate column of the self-timed instruction marking circuit 220. Although not shown in FIG. 4 for purposes of clarity, byte latches 28, length decoders 130, and marking units 34 are interconnected by various signal lines in order to implement the self-timed length decoding and marking of instruction bytes as described previously with regard to FIG. 2 (and described in greater detail in the aforementioned patent application).

As shown in FIG. 4, the first embodiment of the present invention uses a handshaking signaling system to inform downstream columns of the presence of long instructions. Other signaling methods may also be used to achieve a similar effect. As shown in FIG. 4, each length decoder 130 is coupled via long instruction signal lines 131 to a downstream length decoder 130 in a downstream column in order to signal the presence of a long instruction. For example, in this first embodiment as shown in FIG. 4, the length decoder 130 of column j is coupled to the length decoder 130 of column j+4, the length decoder 130 of column j+1 is coupled to the length decoder 130 of column j+5, and so forth. Likewise, each length decoder 130 is also coupled via a long instruction acknowledge line 132 to an upstream length decoder 130 located four byte positions upstream from the present column.

The long instruction signal lines 131 from the length decoders 130 of the end columns of self-timed instruction marking circuit 220 are "wrapped around," so that they are coupled to the appropriate length decoders 130 of the front columns of self-timed instruction marking circuit 220. The long instruction acknowledge lines 132 from the length decoders of the front columns are likewise "wrapped around" so that they are coupled to the appropriate length decoders 130 of the end columns of the circuit.

Note that the byte distance between the "head" length decoder 130 and the "tail" length decoder 130—in this case, four bytes—may be set at a different value, as long as the principles discussed below are followed.

The number of long instruction signal lines 131 used between each length decoder 130 is dependent on the maximum instruction length of the instruction architecture, and also by the encoding scheme used for long instruction signals and the "optimal" instruction length for the computer system. For example, in the first embodiment, the long instruction signals are encoded by "one-hot" encoding, i.e., only one line is active. Thus one long instruction signal line 131 is required for each instruction length to be signaled. Other encoding schemes could also be used, and the number of long instruction signal lines 131 would be affected accordingly.

Also in the first embodiment, the optimal instruction length is seven, i.e., instructions of length eight, nine, ten or eleven are considered "long" instructions and must be signaled. The first embodiment shown in FIG. 4 implements signaling in a "fixed head, variable tail" arrangement. For each long instruction, the "head" (i.e. the first bytes of the instruction) is fixed at a length of, for example, four bytes. The "tail" (i.e., the last bytes of the instruction) will then vary between four and seven bytes, depending upon the instruction length. In such an implementation, the long instruction signal must be able to communicate which of the four conditions (four, five, six or seven byte tail) is present. One of skill in the art will recognize that various other implementations can be substituted (for example, a fixed head of seven bytes and a variable tail of one to four bytes).

In addition to the long instruction handshaking lines described above, a column mark line 137 is provided between each length decoder 130 and its associated marking unit 34. As further described below, this line is used to carry a signal indicating that the column has been marked as a first byte of an instruction.

As shown in FIG. 4, to implement the first embodiment as discussed above, four long instruction signal lines 131 are used between each pairing of length decoders 130. Each long instruction signal line is used to signal a different length to the length decoder 130 of column j+4, as is further described below.

Figure 5:
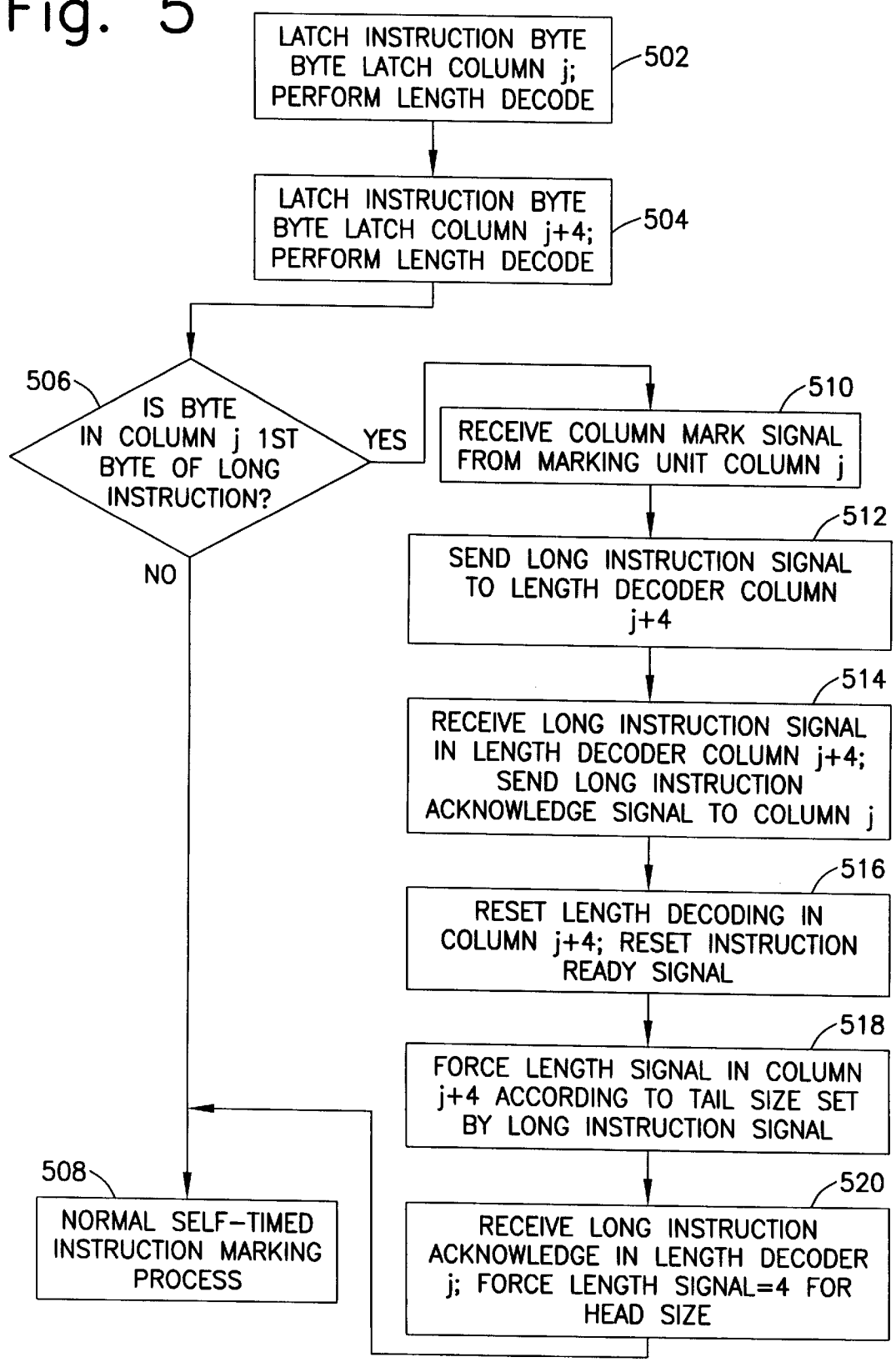
FIG. 5 is a flow chart of the operation of the self-timed marking circuit of FIG. 4.

The operation of the first embodiment of the present invention can be described with reference to the processing of an instruction byte by columns j and j+4 of the instruction marking circuit, as illustrated by the flowchart of FIG. 5. According to the operation of the self-timed instruction marking process (as described previously), in step 502 an instruction byte is latched into byte latch 28 of column j, and this byte is received by the length decoder 130 of column j. The length decoder performs a length decode on the byte to determine the length of the instruction (should the byte be marked as a first byte of an instruction). In step 504 an instruction byte is latched into byte latch 28 of column j+4, received by length decoder 130 of column j+4, and length decoding is commenced. Note that steps 502 and 504 may occur simultaneously.

In decision step 506, if the length decoder 130 of column j determines that the instruction length is seven bytes or less, normal processing of the instruction byte is commenced (step 508). That is, an appropriate length signal is sent from the length decoder 130 of column j to the marking unit 34 of column j to indicate the instruction length. An instruction ready signal is provided from length decoder 130 to marking unit 34 to indicate that all instruction bytes are ready to be transferred. The marking unit then produces a marking signal to mark the downstream column that corresponds to the first byte of the next instruction, according to the timing described previously for the self-timed instruction marking operation.

If the length decoder 130 of column j determines that the instruction length is more than seven bytes, long instruction handling procedures are invoked. An example of such long instruction handling procedures is shown by steps 510–520 of FIG. 5. In step 510, length decoder 130 awaits receipt of a signal indicating that column j has been marked as the first byte of an instruction.

This signal is provided by the marking unit 34 over the column mark line 137, and is, for example, a logical ORing of all the marking lines 35 connected as inputs to marking unit 34. Once the column mark has been indicated, in step 512 a long instruction signal is output over an appropriate long instruction signal line 131 to indicate to the length decoder 130 of column j+4 the number of additional bytes (four, five, six or seven) that should be included with the present instruction. For example, should the length decoder 130 of column j determine that the instruction length is ten, a long instruction signal is output over the appropriate long instruction signal line 131 to indicate to the length decoder 130 of column j+4 that six additional bytes should be included with the instruction.

In step 514, the length decoder 130 of column j+4 receives the long instruction signal over the long instruction signal lines 131, and outputs a long instruction acknowledge signal over the long instruction acknowledge line 132, indicating that the length decoder 130 of column j+4 has received the long instruction signal. Receipt of this long instruction signal causes the length decoder 130 of column j+4 to reset (step 516). Thus, whatever length decoding result was produced or was in the process of being produced is aborted. This also causes the instruction ready signal to reset. Finally, a length signal matching the quantity signaled over the long instruction line 131 is forced on the length signal line 38 of the length decoder 130 of column j+4 (step 518). When the long instruction acknowledge signal is received by the length decoder 130 of column j (step 520), it forces its length signal outputs to send a length signal of "four" to the marking unit 34 of column j over the length signal lines 38. With the length signals of the length decoders 130 of columns j and j+4 properly set, normal instruction handling can resume (step 508).

To illustrate with respect to an instruction with an instruction length of ten, the long instruction handling system causes the length signal lines 38 of column j to signal an instruction length of four to the marking unit 34 of column j, and causes the length signal lines 38 of column j+4 to signal an instruction length of six to the marking unit 34 of column j+4. As per normal self-timed marking as previously described, the marking unit 34 of column j awaits a signal from length decoder 130 of column j indicating that all four instruction bytes are ready for transmission (for example, the INSTRUCTION_READY signal), and a signal from instruction steering circuit 22 indicating that it is ready to receive instruction bytes (for example, the BUFFER_AVAILABLE signal). When these indications are provided, marking unit 34 of column j sends a marking signal to the marking unit 34 four columns downstream—marking unit 34 of column j+4—and the four bytes are sent to the instruction steering circuit 22. Marking unit 34 of column j+4 similarly awaits indications that the six instruction bytes it is processing are ready for transmission and that the instruction steering circuit 22 is available. When these indications are received, the marking unit 34 of column j+4 sends a marking signal to the marking unit 34 six columns downstream and the six bytes are sent to the instructions steering circuit 22. Thus, a ten byte instruction is processed as a head of four bytes and a tail of six bytes according to the first embodiment of the present invention.

In order to allow the subsequent decoding circuitry (for example, the instruction decoding circuit 24) to associate the instruction head bytes with the instruction tail bytes, the actual instruction length is transmitted with the head bytes. Thus, continuing with the previous example of a ten byte instruction, the four head bytes are transmitted to the instruction steering circuit 22 along with an instruction length of ten. The six tail bytes are then transmitted to the instruction steering circuit 22 (the instruction length data in this case becomes irrelevant). The subsequent circuitry can then append the tail bytes to the head bytes to reconstruct the instruction. Alternately, the instruction length data could contain a flag bit to indicate the presence of long instruction, and thus indicate that the first set of instruction bytes (head) should be included with the second set of instruction bytes (tail).

FIG. 6 shows a block diagram of a portion of a second embodiment of a self-timed instruction marking circuit according to the present invention. Although only a portion of the instruction marking circuit 420 is shown, the interconnection and operation of the described generic columns (column j, j+1, j+2, and so forth) is equivalent to that of all columns of the circuit. The self-timed instruction marking circuit 420 includes byte latches 28, length decoders 230, and marking units 34, with each byte latch 28, length decoder 230 and marking unit 34 located in a separate column of the self-timed instruction marking circuit 420. Although not shown in FIG. 6 for clarity, byte latches 28, length decoders 230, and marking units 34 are interconnected by signal lines in order to implement the self-timed length decoding and marking of instruction bytes as described previously.

In contrast to the first embodiment, each length decoder 130 is coupled via long instruction signal lines 131 to multiple downstream length decoders 130 in downstream columns in order to signal the presence of a long instruction. For example, as shown in FIG. 6, the length decoder 230 of column j is coupled to the length decoders 230 of columns j+1, j+2, j+3, and j+4. Each length decoder 230 is also coupled via one of the long instruction acknowledge lines 132 to upstream length decoders 230 in multiple upstream columns in order to acknowledge the receipt of the long instruction signal. For example, as shown in FIG. 6, the length decoder 230 of column j+4 is coupled to the length decoders 230 of columns j, j+1, j+2 and j+3.

The long instruction signal lines 131 from the length decoders 230 of the end columns of self-timed instruction marking circuit 420 are "wrapped around," so that they are coupled to the appropriate length decoders 230 of the front columns of self-timed instruction marking circuit 420. The long instruction acknowledge lines 132 from the length decoders of the front columns are likewise "wrapped around" so that they are coupled to the appropriate length decoders 230 of the end columns of the circuit.

Note that the number of length decoders 230 that receive long instruction signal lines 131—in the case of the second embodiment, four—may be set at a different value, as long as the principles discussed below are followed.

The number of long instruction signal lines 131 used between each length decoder 230 is dependent on the maximum instruction length of the instruction architecture and the "optimal" instruction length for the computer system. For example, in this second embodiment, the optimal instruction length is seven, i.e., instructions of length eight, nine, ten or eleven are considered "long" instructions and must be signaled. Thus, four signaling lines are needed.

The second embodiment shown in FIG. 6 implements signaling in a "variable head, fixed tail" arrangement. For each long instruction, the head may contain a variable amount of bytes depending on the instruction length (in this case one, two, three or four bytes). The tail will then be fixed to contain seven bytes. The long instruction signal must therefore be sent to the length decoder 230 of the proper column—column j+1, j+2, j+3 or j+4—to indicate which instruction length is present—eight, nine, ten or eleven bytes, respectively. Thus, to implement the second embodiment as shown in FIG. 6, four long instruction signal lines 131 are used, one between each length decoder 230 and the length decoders 230 of the next four downstream columns.

In addition to the long instruction handshaking lines described above, a column mark line 137 is provided between each length decoder 230 and its associated marking unit 34. As further described below, this line is used to carry a signal indicating that the column has been marked as a first byte of an instruction.

Figure 7:
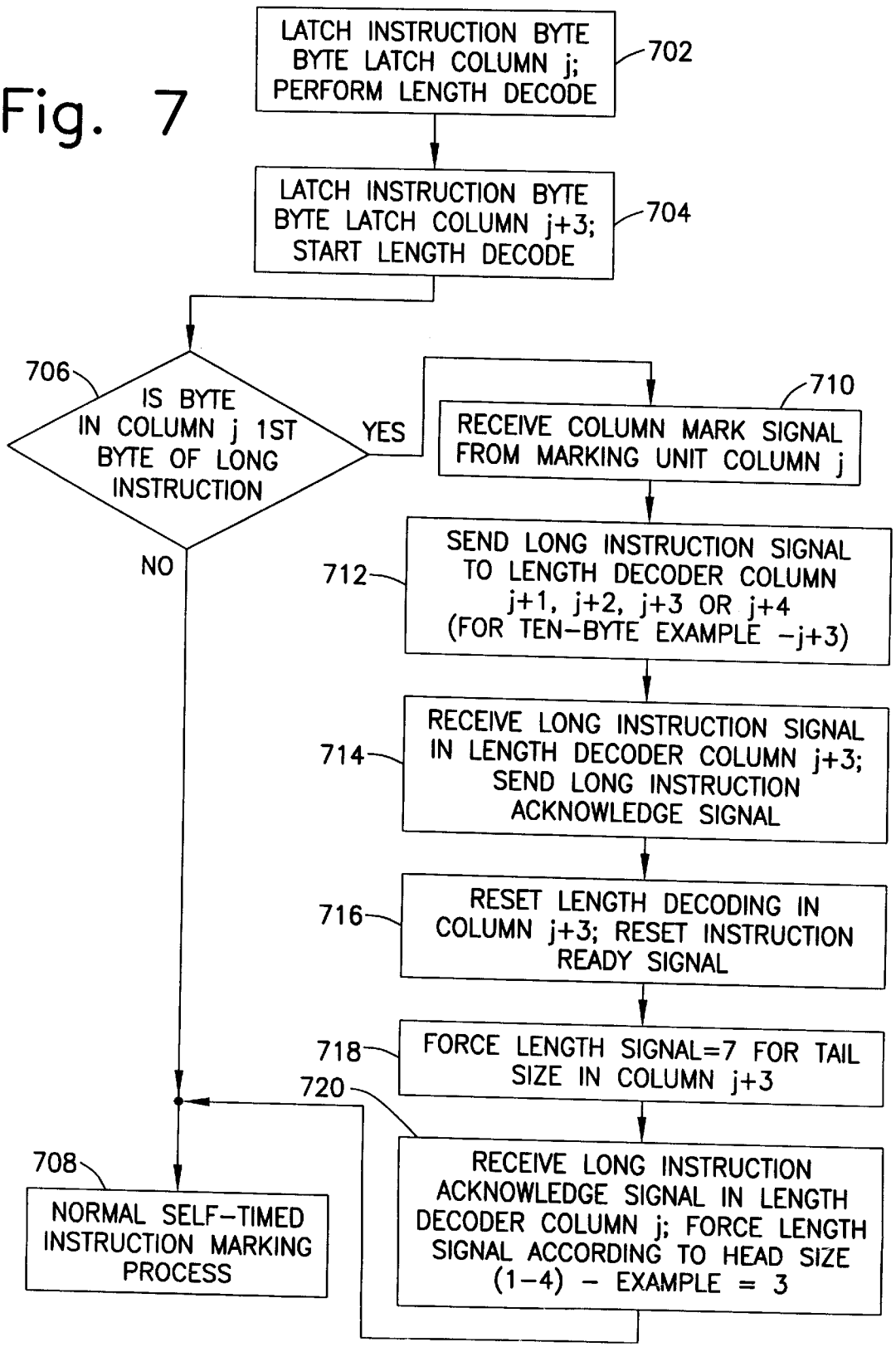
FIG. 7 is a flow chart of the operation of the self-timed marking circuit of FIG. 6.

The operation of the second embodiment of the present invention can be described using the example of the processing of a ten byte instruction by columns j and j+3 of the instruction marking circuit 420, as illustrated by the flowchart of FIG. 7. In step 702, according to the operation of the self-timed instruction marking process (as described previously), an instruction byte is latched into byte latch 28 of column j, and this byte is received by the length decoder 230 of column j. The length decoder 230 performs a length decode on the byte to determine the length of the instruction (should the byte be marked as a first byte of an instruction). In step 704, an instruction byte is latched into the byte latch 28 of column j+3, transmitted to the length decoder 230 of column j+3, and length decoding commenced. Note that steps 702 and 704 may occur simultaneously.

In decision step 706, if the length decoder 230 determines that the instruction length is seven bytes or less, normal processing of the instruction byte is commenced (step 708). That is, an appropriate length signal is sent from the length decoder 230 to the marking unit 34 of column j to indicate the instruction length. After receipt of the necessary indications, the marking unit 34 then produces a marking signal to mark the downstream column that corresponds to the first byte of the next instruction, according to the timing described previously for the self-timed instruction marking operation.

If the length decoder 230 of column j determines that the instruction length is more than seven bytes, long instruction handling procedures are invoked. An example of such long instruction handling procedures is shown by steps 710–720 of FIG. 7. In step 710, length decoder 230 of column j awaits receipt of a signal indicating that column j has been marked as the first byte of an instruction. This signal is provided by the marking unit 34 over the column mark line 137 and is, for example, a logical ORing of all the marking lines 35 connected as inputs to marking unit 34. Once the column mark indication has been received, in step 712 a long instruction signal is output over an appropriate long instruction signal line 131 to indicate to the appropriate downstream length decoder 230 that a long instruction is being processed. For example, should the length decoder 230 of column j determine that the instruction length is ten, a long instruction signal is output over the long instruction signal line 131 to the length decoder 230 of column j+3 (10−7=3).

The length decoder 230 of column j+3 receives the long instruction signal over the long instruction signal lines 131, and outputs a long instruction acknowledge signal over the long instruction acknowledge line 132 (step 714), indicating that the length decoder 230 of column j+3 has received the long instruction signal. Receipt of the long instruction signal causes the length decoder 230 of column j+3 to reset (step 716). Thus, whatever length decoding result was produced or was in the process of being produced is aborted. This reset also causes the instruction ready signal produced by the length decoder 230 to reset, thus aborting any possible marking operation based on the now incorrect length decoding. A length signal of seven is forced to be signaled over the length signal lines 38 of column j+3 (step 718). When the long instruction acknowledge signal is received by the length decoder 230 of column j (step 720), an appropriate length signal (one, two, three or four—in this example, three) is forced to be output over the length signal lines 38 to the marking unit 34 of column j. With the length signals of the length decoders 230 of columns j and j+3 properly set, normal instruction handling can resume (step 708).

To illustrate the marking process with respect to the above example of a ten byte instruction, the instruction handling system of the second embodiment causes the length signal lines 38 of column j to signal an instruction length of three to the marking unit 34 of column j, and causes the length signal line 38 of column j+3 to signal an instruction length of seven to the marking unit 34 of column j+3. As per normal self-timed marking as previously described, the marking unit 34 of column j awaits indications that the three instruction bytes it is processing are ready for transmission, and that the instruction steering circuit 22 is available. When these indications are received, the marking unit 34 of column j sends a marking signal to the marking unit 34 three columns downstream—marking unit 34 of column j+3—and the three instruction bytes are sent to the instruction steering circuit 22. Marking unit 34 of column j+3 similarly awaits indications that the seven instruction bytes it is processing are ready for transmission and that the instruction steering circuit 22 is available. When these indications are received, the marking unit 34 of column j+3 sends a marking signal to the marking unit 34 seven columns downstream, and the seven instruction bytes are sent to the instruction steering circuit 22. Thus, a ten byte instruction is processed as a three byte head and a seven byte tail according to the second embodiment of the present invention.

As was the case for the first embodiment, in order to allow the subsequent decoding circuitry (for example, the instruction decoding circuit 24) to associate the instruction head bytes with the instruction tail bytes, the actual instruction length is transmitted with the head bytes. Thus, continuing with the previous example of a ten byte instruction, the head bytes are transmitted to the instruction steering circuit 22 along with an instruction length of ten. The seven tail bytes are then transmitted to the instruction steering circuit 22 (the instruction length data for these bytes is ignored). The subsequent circuitry can then append the tail bytes to the head bytes to reconstruct the instruction. Alternately, the instruction length data could contain a flag bit to indicate the presence of a long instruction, and thus indicate that the first set of instruction bytes (head) should be included with the second set of instruction bytes (tail).

Both the first embodiment and the second embodiment of the present invention may be implemented in a multiple marking unit instruction marking circuit such as shown in FIG. 3. The effect of using multiple rows of marking units and steering circuitry is to place the head bytes in the output buffer 64 of one row (for example, row k) and the tail bytes in the output buffer of the next row (for example, row k+1). Thus, the subsequent circuitry of the instruction decode block can reconstruct the instruction in the normal manner of sequentially accessing the output buffers by increasing row designation, as is already the case for the multiple row implementation.

Although the present invention has been described with respect to specific embodiments, various changes and modifications may be suggested to one skilled in the art. For example, it may be contemplated to implement part or all of the present invention as hardware, microcode, programmable logic, and/or software. The present invention is intended to encompass these and other changes and modifications as fall within the scope of the appended claims.

What is claimed is:

1. An instruction marking circuit, comprising:
   a plurality of columns, each one of the plurality of columns including
      a length decoder, including a length signal output, a long instruction output and a long instruction input, wherein the long instruction output is coupled to the long instruction input of a length decoder of a first downstream column to provide a long instruction signal; and
      a self-timed marking unit coupled to the length decoder and having a first marking output and a second marking output to provide a marking signal, and a marking input to receive the marking signal, wherein the first marking output is coupled to a self-timed marking unit of the first downstream column, and the second marking output is coupled to a self-timed marking unit of a second downstream column, and wherein the marking input is coupled to a self-timed marking unit of an upstream column.

2. The instruction marking circuit of claim 1, further comprising a handshaking system between the length decoder and the length decoder of the first downstream column.

3. The instruction marking circuit of claim 2, wherein the handshaking system comprises the length decoder having a long instruction acknowledge output and a long instruction acknowledge input, and wherein the long instruction acknowledge input is coupled to the long instruction acknowledge output of the length decoder of the first downstream column to provide a long instruction acknowledge signal.

4. The instruction marking circuit of claim 3, wherein the length decoder is coupled to the length decoder of the first downstream column in order to implement a variable head, fixed tail system.

5. The instruction marking circuit of claim 4, wherein the long instruction output includes a number of long instruction outputs, the long instruction acknowledge output is one long instruction acknowledge output, the long instruction input is a number of long instruction inputs and the long instruction acknowledge input is one long instruction acknowledge input, wherein
   the number of long instruction outputs are coupled to the number of long instruction inputs of the length decoder of the first downstream column, and
   the one long instruction acknowledge input is coupled to the one long instruction acknowledge output of the length decoder of the first downstream column.

6. The instruction marking circuit of claim 5, wherein the first downstream column is four columns away.

7. The instruction marking circuit of claim 3, wherein the length decoder is coupled to implement a fixed head, variable tail system.

8. The instruction marking circuit of claim 7, wherein the long instruction output includes a first long instruction output and a second long instruction output, the long instruction acknowledge output is one long instruction acknowledge output, the long instruction input includes a first long instruction input and a second long instruction input, and the long instruction acknowledge input includes a first long instruction acknowledge input and a second long instruction acknowledge input, and wherein
   the first long instruction output is coupled to the first long instruction input of the length decoder of the first downstream column and the first long instruction acknowledge input is coupled to the one long instruction acknowledge output of the length decoder of the first downstream column, and
   the second long instruction output is coupled to the second long instruction input of the length decoder of a second downstream column and the second long instruction acknowledge input is coupled to the one long instruction acknowledge output of the length decoder of the second downstream column.

9. The instruction marking circuit of claim 3, wherein the plurality of columns includes a front column and an end column, and wherein
   the long instruction output of the length decoder of the end column is coupled to the long instruction input of the length decoder of the front column, and the long instruction acknowledge input of the length decoder of the end column is coupled to the long instruction acknowledge output of the length decoder of the front column.

10. The instruction marking circuit of claim 1, wherein each of the plurality of columns further includes a byte latch coupled to the length decoder.

11. The instruction marking circuit of claim 10, further comprising an instruction line buffer having a plurality of byte positions corresponding to the plurality of columns, and coupled to the byte latch of each of the plurality of columns to provide an instruction byte stored in each byte position to the byte latch of the corresponding column.

12. The instruction marking unit of claim 1, wherein each column includes multiple self-timed marking units coupled to the length decoder.

13. The instruction marking circuit of claim 1, wherein the self-timed marking unit provides a marking signal directly to one of the self-timed marking unit of the first downstream column and the self-timed marking unit of the second downstream column.

14. A method for marking variable-length instructions, comprising the steps of:
  receiving a first byte in a first column of an instruction marking circuit;
  receiving a second byte in a second column of an instruction marking circuit, the second column being downstream from the first column;
  length decoding the first byte, including determining whether the instruction is a long instruction; and
  when the instruction is a long instruction, providing a long instruction signal to the second column.

15. The method of claim 14, further comprising the steps of:
  when the instruction is long instruction,
    providing a first length signal in the first column representing a length of a head of the long instruction,
    providing a second length signal in the second column representing a length of a tail of the long instruction,
    providing a first marking signal to the second column based on the first length signal, and
    providing a second marking signal to a third column based on the second length signal, the third column being downstream from the second column.

16. The method according to claim 15, further comprising the step of providing a long instruction acknowledge signal from the second column to the first column when the long instruction signal has been received by the second column.

17. The method according to claim 14 wherein the long instruction signal comprises at least one signal indicating the length of the tail of the long instruction.

18. The method according to claim 14, wherein the length decoding step is performed in a length decoder.

* * * * *